United States Patent [19]

Schwab et al.

[11] Patent Number: 4,770,903

[45] Date of Patent: Sep. 13, 1988

[54] PREPARATION OF COBALT-CONTAINING, ACICULAR, MAGNETIC IRON OXIDES

[75] Inventors: Ekkehard Schwab, Neustadt; Werner Steck, Ludwigshafen; Wilhelm Schloesser, Worms; Rainer Feser, Gruenstadt, all of Fed. Rep. of Germany

[73] Assignee: BASF Aktiengesellschaft, Ludwigshafen, Fed. Rep. of Germany

[21] Appl. No.: 45,552

[22] Filed: May 4, 1987

[30] Foreign Application Priority Data

May 13, 1986 [DE] Fed. Rep. of Germany ....... 3616096

[51] Int. Cl.$^4$ .............................................. B05D 5/12
[52] U.S. Cl. ...................................... 427/128; 427/127
[58] Field of Search ................................ 427/127, 128

[56] References Cited

U.S. PATENT DOCUMENTS 3,573,980   4/1971   Haller et al. ......................... 117/238
4,122,216  10/1978   Okazoe et al. ....................... 427/128
4,267,207   5/1981   Sasazawa et al. .................... 427/129

FOREIGN PATENT DOCUMENTS 1441185  6/1976  United Kingdom .
1589355  5/1981  United Kingdom .
2125021  2/1984  United Kingdom .

OTHER PUBLICATIONS

M. Kishimoto et al., Journal of Magnetism & Magnetic Materials 31–34, (1983), 943–944.

Primary Examiner—Bernard D. Pianalto
Attorney, Agent, or Firm—Keil & Weinkauf

[57] ABSTRACT

Acicular, magnetic iron oxide consisting of a core of gamma-iron(III) oxide and a ferrite shell containing a total of from 0.4 to 12% by weight of cobalt(II) ions and from 0.1 to 15% by weight of iron(II) ions, the percentages being based on the total amount of magnetic material, is prepared by a process in which an iron(II) hydroxide precipitate is applied to the gamma-iron(III) oxide core in a first stage and an iron-(II)/cobalt hydroxide precipitate is applied to the said core in a second stage, and the core is then converted to the ferrite shell by oxidation.

5 Claims, 1 Drawing Sheet

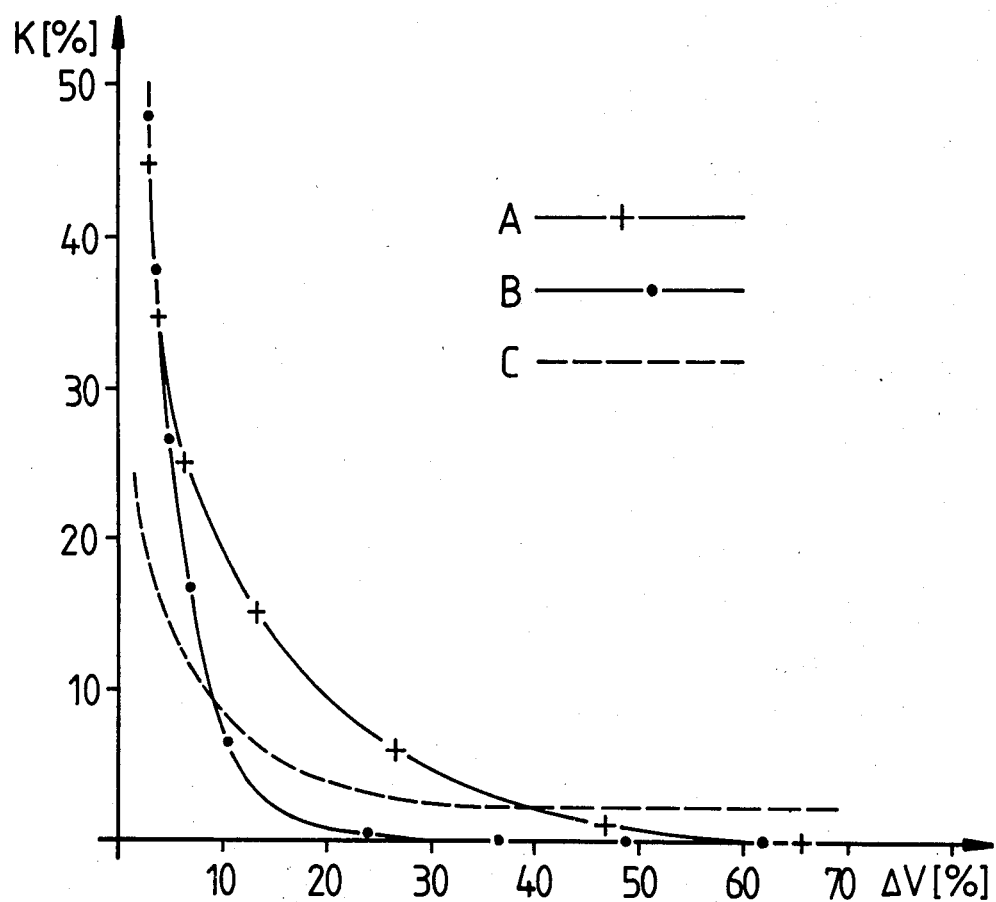

PREPARATION OF COBALT-CONTAINING, ACICULAR, MAGNETIC IRON OXIDES

The present invention relates to a process for the preparation of acicular, magnetic iron oxide consisting of a core of gamma-iron(III) oxide and a ferrite shell containing from 0.4 to 12% by weight of cobalt(II) ions and from 0.1 to 15% by weight of iron(II) ions, the percentages being based on the total amount of magnetic material.

Acicular gamma-iron(III) oxide has long been used in large amounts as magnetizable material in the production of magnetic recording media. However, because of the continued development in the area of recording technology, there has been an increase in demand for magnetic materials which are distinguished in particular by a higher coercive force than that of gamma-iron(III) oxide.

It is known that the coercive force of magnetic iron oxides can be substantially increased by doping with cobalt; however such materials have a number of undesirable properties, in particular thermal and mechanical instability of residual induction and coercive force, when doping with cobalt is effected as volume doping.

The magnetic properties of the pigments are substantially improved when doping is carried out so that the cobalt is present in the form of a magnetic cobalt compound in an outer shell on a substantially cobalt-free core of gamma-$Fe_2O_3$ or berthollide iron oxides. Several methods have been described for the preparation of such pigments having a layer structure. These essentially involve the application of a cobalt-containing compound to magnetic acicular iron oxide followed by heating of the coated oxides, as described in, for example, British Pat. No. 1,441,185 or U.S. Pat. No. 3,573,980. However, if the above disadvantage of volume doping are to be avoided, only a limited increase in the coercive force can be achieved by means of these methods. Application of a mixture of Fe(II) hydroxide and Co hydroxide with simultaneous oxidation of the coating has also been disclosed (German Laid-Open Application DOS No. 2,235,383). Although this makes it possible to achieve greater increases in the coercive forece, relatively large amounts of cobalt are required for this purpose, ie. utilization of the cobalt is poor. Furthermore, EP-A No. 14 902 and EP-A No. 14 903 disclose that a mixture of Fe(II) hydroxide and Co hydroxide can be applied to the gamma-iron(III) oxide while simultaneously passing in an inert gas in order to prevent oxidation of the divalent iron. This process permits greater increases in the coercive force to be achieved with a lower cobalt content. However, the particles prepared in this manner do not possess particularly pronounced core/shell structures, so that the disadvantages described in connection with volume doping are once again encountered, particularly in the case of pigments having a high coercive force. This is attributable to the fact that the high Fe(II) concentrations required to achieve high coercive forces in this process greatly accelerate diffusion of the cobalt into the interior of the particle. German Laid-Open Application DOS No. 2,811,473 furthermore discloses the process in which suspended gamma-iron(III) oxide is first applied in the form of a layer onto an iron(II)/cobalt hydroxide mixture under an inert gas atmosphere, and the said mixture is then subjected to an oxidative treatment at not less than 60° C. In this process too, penetration of cobalt ions into the gamma-iron(III) oxide core during the heat treatment, and the associated disadvantages, are to be expected. Moreover, it is difficult to obtain reproducible product properties by means of this process.

It is an object of the present invention to provide a process in which doping of magnetic, acicular iron oxides with cobalt is carried out in a manner such that a particle having pronounced core/shell structure and a large increase in the coercive force is obtained in a readily reproducible manner with the addition of low cobalt concentrations and with low Fe(II) contents in the ready-prepared pigment.

We have found that this object is achieved, and that acicular, magnetic iron oxide consisting of a core of gamma-iron(III) oxide and a ferrite shell containing a total of from 0.4 to 12% by weight of cobalt(II) ions and from 0.1 to 15% by weight of iron(II) ions, the percentages being based on the total amount of material, can be prepared in a simple manner and has the required properties, if (1) acicular magnetic gamma-iron(III) oxide is suspended in water and, under an inert gas atmosphere at from 5° to 60° C., is provided with an iron(II) hydroxide precipitate in an amount corresponding to from 2 to 6% by weight, based on the gamma-iron(III) oxide used, of iron ions by precipitating iron(II) ions by means of alkalis, (2) an iron(II) hydroxide/cobalt hydroxide precipitate is precipitated onto the gamma-iron(III) oxide obtained in step (1), by the addition of a solution containiron(II) and cobalt(II) ions to the suspension and by means of an alkali, under an inert gas at from 5° to 60° C., preferably from 20° to 95° C., and (3) the said precipitate is oxidized by passing gaseous oxidizing medium into the suspension at from 5° to 35° C. and then (4) converted to the ferrite shell at a suspension temperature of from 35° to 95° C. under an inert gas atmosphere in the course of from 1 to 5 hours.

In a preferred embodiment of the novel process, the hydroxide is precipitated at pH 12 or higher.

After it has been filtered off, washed and dried, the material prepared by the novel process can be heated for a further 1-5, preferably 1-2, hours under an inert gas atmosphere at from 100° to 150° C.

In carrying out the novel process, the conventional starting materials are used and the procedure is carried out in the manner described.

Suspending in water is usually effected by means of a dispersing apparatus based on the rotor/stator principle.

The aqueous iron(II) and cobalt solutions are preferably prepared from the corresponding sulfates or chlorides, while sodium hydroxide is generally used for precipitating the hydroxides. The inert gas atmosphere is obtained by blanketing the reaction vessels with a stream of nitrogen or by passing in nitrogen, and the oxidation is carried out by passing an oxidizing gas, usually air, through the suspension.

The distribution of cobalt in the corresponding magnetic materials can be determined, inter alia, by a method described by M. Kishimoto et al. in J. Magn. Mat. 31-34 (1983), 943. In this method, the pigment is treated with acids of increasing concentration for a certain time in order to dissolve increasing amounts of the particles. The residual pigment in each case is subjected to chemical analysis. From these analytical data, concentration depth profiles for the individual elements can be calculated using the following equation:

$$\% X = \frac{(\text{Amount of } X)_n - (\text{Amount of } X)_{n+1}}{(\text{Loss})_{n+1} - (\text{Loss})_n} \times 100,$$

where the loss is the total loss of dissolved pigment and the amount X is the weight of element X still present in the residue.

A gamma-Fe$_2$O$_3$ pigment having the following characteristics was used for the Examples and Comparative Experiments described below:

$H_c(\rho=1.2)$: 24.5 kA/m
$M_r/\rho$: 39.5 nTm$^3$/g
$S_{N2}$: 46.8 m$^2$/g.

The magnetic properties of the materials were measured in a vibrating sample magnetometer in a magnetic field of 160 kA/m, these properties being the coercive force $H_c$ in [kA/m], based on a tap density $\rho$ of 1.2 mg/mm$^3$ ($H_c\rho=1.2$), the specific remanence $M_r/\rho$ in [nTm$^3$/g] and the specific saturation magnetization $m_m/\rho$ in [nTm$^3$/g] or as $M_S/\rho$ in [nTm$^3$/g] in a magnetic field of 800 kA/m.

EXAMPLE 1

25 g of $\gamma$-Fe$_2$O$_3$ were dispersed in 100 ml of water. 4.98 g of FeSO$_4$. 7H$_2$O, dissolved in 20 ml of water, were added to the resulting dispersion, and the mixture was heated to 50° C. with further dispersing and while passing in nitrogen. When 50° C. had been reached, the dispersion was brought to pH 12 by adding 5N NaOH and stirring was continued for 1 hour at this temperature. The mixture was then cooled to 20° C.

9.95 g of FeSO$_4$.7H$_2$O and 4.77 g of CoSO$_4$.7H$_2$O, dissolved in water in each case, were added in succession to the cooled dispersion, after which the dispersion was brought to a pH greater than 14 with 10N NaOH. After the resulting precipitation of Fe(OH)$_2$ and Co(OH)$_2$, the mixture was gassed with air instead of nitrogen, and the precipitate was oxidized for 1 hour at 25° C.

Stirring was then continued for 2 hours at 95° C. while gassing with nitrogen, and the oxidized hydroxide precipitate was converted to cobalt ferrite. The suspension was filtered and the product was washed alkali-free and dried at below 100° C. The data below were measured on the pigment.

Coercive force $H_c(\rho=1.2)$: 47.5 kA/m
Specific remanence $M_r/\rho$: 40.1 nTm$^3$/g
Relative remanence $M_r/M_m$: 0.56
Relative remanence $M_r/M_s$: 0.47
Fe(II) content: 2.9% by weight
Co content: 3.3% by weight.

EXAMPLE 2

The procedure described in Example 1 was followed, except that the dispersion was brought to a pH greater than 14 with 10N NaOH directly after the addition of the first iron(II) salt solution. A pigment having the following data was obtained.

Coercive force $H_c(\rho=1.2)$: 53.4 kA/m
Specific remanence $M_r/\rho$: 42.7 nTm$^3$/g
Relative remanence $M_r/M_m$: 0.56
Relative remanence $M_r/M_s$: 0.47
Fe(II) content: 2.6% by weight
Co content: 3.3% by weight.

The FIGURE shows the distribution of the cobalt in the particles prepared as described in Example 2 (curve A), K being the percentage of cobalt in the particle range dissolved in each case and V being the percentage weight loss as a result of acid attack.

COMPARATIVE EXPERIMENT 1

25 g of gamma-Fe$_2$O$_3$ were dispersed in 100 ml of water, and first 4.77 g of CoSO$_4$.7H$_2$O and then 14.93 g of FeSO$_4$.7H$_2$O, dissolved in 20 ml of water in each case, were added. Stirring was then continued for 15 minutes in order to homogenize the mixture. The mixture was heated to 50° C. and 5N NaOH was added at this temperature to bring the pH to 12. Stirring was then continued for a further 4 hours at this temperature. Nitrogen was blown into the suspension during the entire reaction time in order to prevent oxidation of the Fe(II) used.

The suspension was filtered and the product was washed alkali-free and dried at below 100° C. The following data were determined on the pigment:

Coercive force $H_c(\rho=1.2)$: 54.8 kA/m
Specific remanence $M_r/\rho$: 47.3 nTm$^3$/g
Relative remanence $M_r/M_m$: 0.58
Relative remanence $M_r/M_s$: 0.49
Fe(II) content: 7.9% by weight
Co content: 3.5% by weight.

Curve C in the FIGURE shows the distribution of cobalt in the particles prepared as described in Comparative Experiment 1.

COMPARATIVE EXPERIMENT 2

The procedure described in Comparative Experiment 1 was followed, except that the pigment obtained was subjected to an oxidative after-treatment by heating it for a further 60 minutes at 200° C. in a nitrogen/oxygen atmosphere containing 160 ppm of oxygen. The following data were then measured:

Coercive force $H_c(\rho=1.2)$: 48.8 kA/m
Specific remanence $M_r/\rho$: 44.1 nTm$^3$/g
Relative remanence $M_r/M_m$: 0.57
Relative remanence $M_r/M_s$: 0.50
Fe(II) content: 4.6% by weight
Co content: 3.5% by weight.

COMPARATIVE EXPERIMENT 3

25 g of gamma-Fe$_2$O$_3$ were dispersed in 100 ml of water, 19.2 g of FeSO$_4$.7H$_2$O and 9.36 g of CoSO$_4$.7H$_2$O, dissolved in 40 ml of water, were added and 10 g of NaOH, dissolved in 20 ml of water, were then introduced. The resulting gamma-Fe$_2$O$_3$/metal hydroxide suspension was heated to 80° C. while passing in nitrogen, the nitrogen was replaced with air after this temperature was reached, and stirring was continued for 3 hours.

The product obtained was filtered off, washed alkali-free and dried under nitrogen. The following data were measured:

Coercive force $H_c(\rho=1.2)$: 55.0 kA/m
Specific remanence $M_r/\rho$: 42.9 nTm$^3$/g
Relative remanence $M_r/M_m$: 0.56
Relative remanence $M_r/M_s$: 0.50
Fe(II) content: 2.7% by weight
Co content: 6.1% by weight.

The FIGURE shows the cobalt distribution in the particles prepared as described in Comparative Experiment 3 (curve B).

COMPARATIVE EXPERIMENT 4

The procedure described in Comparative Experiment 3 was followed, except that only 4.77 g of $CoSO_4$ and 14.93 g of $FeSO_4.7H_2O$ were used, and were precipitated as the hydroxides by adding 8 g of NaOH dissolved in 20 ml of water.

A pigment having the following data was obtained:
Coercive force $H_c(\rho=1.2)$: 47.1 kA/m
Specific remanence $M_r/\rho$: 44.2 $nTm^3/g$
Relative remanence $M_r/M_m$: 0.55
Relative remanence $M_r/M_s$: 0.47
Fe(II) content: 3.2% by weight
Co content: 3.2% by weight.

We claim:

1. A process for the preparation of acicular, magnetic iron oxide consisting of a core of gamma-iron(III) oxide and a ferrite shell containing a total of from 0.4 to 12% by weight of cobalt(II) ions and from 0.1 to 15% by weight of iron(II) ions, the percentages being based on the total amount of the material, which process comprises:

(1) suspending acicular magnetic gamma-iron(III) oxide in water; adding an aqueous solution of iron(II) ions to the suspension under an inert gas atmosphere and at a temperature of from 5° to 60° C. and subsequently adding an alkali to the suspension to precipitate from 2 to 6% by weight of iron(II) hydroxide onto the gamma iron(III) oxide;

(2) adding to the suspension a solution containing iron(II) and cobalt(II) ions, and thereafter adding an alkali to the suspension under an inert gas at from 5° to 60° C. to precipitate iron(II) hydroxide/cobalt hydroxide onto the gamma-iron(III) oxide obtained in step (1);

(3) passing a gaseous oxygen medium into the suspension at from 5° to 35° C. to oxidize the precipitate formed in step (2); and (4) heating the suspension at a temperature of from 35° to 95° C. under an inert atmosphere for from 1 to 5 hours to convert the oxidized precipitate to a ferrite shell.

2. The process of claim 1 wherein precipitation of the iron(II) hydroxide in the first stage of the process is carried out at a pH higher than 12.

3. The process of claim 2, wherein precipitation of the iron(II) and cobalt hydroxide in the second stage of the process is carried out at a pH higher than 14.

4. The process of claim 1, wherein the end product, after it has been dried, is heated at from 100° to 150° C. for from 1 to 5 hours under an inert gas atmosphere.

5. The process of claim 1, wherein precipitation of the iron(II) and cobalt hydroxide in the second stage of the process is carried out at a pH higher than 14.

* * * * *